US007870612B2

(12) United States Patent
Liu

(10) Patent No.: US 7,870,612 B2
(45) Date of Patent: Jan. 11, 2011

(54) ANTIVIRUS PROTECTION SYSTEM AND METHOD FOR COMPUTERS

(75) Inventor: Xu Liu, Fuzhou (CN)

(73) Assignee: Fujian Eastern Micropoint Info-Tech Co., Ltd, Fujian Province (CN)

( * ) Notice: Subject to any disclaimer, the term of this patent is extended or adjusted under 35 U.S.C. 154(b) by 1098 days.

(21) Appl. No.: 11/518,221

(22) Filed: Sep. 11, 2006

(65) Prior Publication Data

US 2008/0066179 A1    Mar. 13, 2008

(51) Int. Cl.
*G06F 12/16* (2006.01)

(52) U.S. Cl. ............................. 726/24; 726/22; 726/23; 726/25; 713/188

(58) Field of Classification Search .................. 726/24; 713/188
See application file for complete search history.

(56) References Cited

U.S. PATENT DOCUMENTS

| 7,487,544 B2* | 2/2009 | Schultz et al. ................. 726/24 |
| 7,509,677 B2* | 3/2009 | Saurabh et al. ............... 726/23 |
| 7,519,998 B2* | 4/2009 | Cai et al. ....................... 726/24 |
| 7,752,668 B2* | 7/2010 | Omote et al. ................. 726/24 |
| 2004/0243829 A1* | 12/2004 | Jordan ......................... 713/200 |
| 2005/0268338 A1* | 12/2005 | Made .......................... 726/24 |
| 2006/0265746 A1* | 11/2006 | Farley et al. ................... 726/22 |

FOREIGN PATENT DOCUMENTS

CN    200510007682.X    8/2006

* cited by examiner

*Primary Examiner*—Kambiz Zand
*Assistant Examiner*—Amare Tabor
(74) *Attorney, Agent, or Firm*—J.C. Patents

(57) ABSTRACT

The example embodiments herein relate to an antivirus protection system and method for computers based on program behavior analysis. The antivirus protection system may comprise: a Process Behavior-Evaluating Unit for identifying the programs existing in the user's computers and classifying them into normal programs and suspect programs; a Program-Monitoring Unit for monitoring and recording the actions and/or behaviors of programs; a Correlation-Analyzing Unit for creating correlative trees and analyzing the correlations of actions and/or behaviors of programs, the correlative trees comprising a process tree and a file tree; a Virus-Identifying Knowledge Base, comprising a Program-Behavior Knowledge Base and a Database of Attack-Identifying Rules; a Virus-Identifying Unit for comparing captured actions and/or behaviors to the information in the Virus-Identifying Knowledge Base to determine whether the program is a virus program. With the techniques of certain example embodiments, it may be possible to increase efficiency and reduce the need to upgrade virus codes after viruses become active, while also effectively blocking unknown viruses, Trojans, etc.

22 Claims, 5 Drawing Sheets

ANTIVIRUS PROTECTION SYSTEM AND METHOD FOR COMPUTERS

FIELD OF THE INVENTION

The example embodiments herein relate to an antivirus protection system and method for computers. Certain example embodiments may characterize the actions and/or behaviors of programs rather than merely matching the "signature" of viruses. Thus, antivirus protection systems and methods for computers based on the behavioral analysis of programs are provided.

BACKGROUND OF THE INVENTION

The struggles for intrusion and anti-intrusion techniques relating to computer viruses have been ongoing. Because computers are widely used, the tension associated with the fighting has increased. Over time, various methods for reducing the intrusions of computer viruses have been developed, resulting in many corresponding protection products. These products can be generally classified into two categories. One group blocks invading viruses. For example, firewalls may reduce the intrusions of the viruses by restricting the communication ports, protocols, etc. The other group searches for virus-infected files that may allow an intrusion. For example, the present generation of antivirus software detects and removes the infected harmful files by scanning the code characteristics of the virus-infected files that may enable intrusions. Although these two types of products do, to a certain extent, fight virus intrusions, they unfortunately suffer disadvantages. For example, although firewalls may block the intrusions of some viruses or hackers, the principle subjects monitored by firewalls are ports and protocols, and the users have to set the rules of constraint by themselves. This technique may result is certain disadvantages. First, to set the rules effectively, the users have to be very familiar with the system. Second, because of the large amount of traffic to monitor, it is unlikely that rules will be set for the ports and protocols necessary for the network applications. If unconstrained communications are allowed, intrusions by viruses or hackers may occur. If they are not allowed, the normal operation of the network may be affected. Antivirus software utilizing the characteristic codes of viruses always trails the development of the viruses. This is because it is only after virus samples are captured that the characteristic codes of viruses can be extracted. Therefore, this kind of antivirus software cannot prevent the intrusions of new unknown viruses, and even computers that have been installed with antivirus software still may be attacked by the viruses. This risk may be reduced by upgrading and updating the virus database which is always later than the occurrence of the viruses.

In addition to the above-mentioned kinds of passive protection systems, the inventor of the present invention has provided an antivirus protection method for computers based on the behavioral analysis of the programs, disclosed in Chinese Patent Application No. 20051 0007682.X, entitled "protection method for computer based on the behavioral analysis of programs." The application has provided a wholly new method for virus protection in which computer programs are identified if they are harmful or attacked by viruses by analyzing the action behaviors of programs.

SUMMARY OF THE INVENTION

Certain example embodiments may overcome one or more of the above-noted disadvantages, and may further improve the computer protection methods based on behavioral analysis of programs, so that they provide a more powerful system solution. One aspect of certain example embodiments relates to the ability to reduce the number of new viruses or Trojans by analyzing the logical behaviors that are meaningful for the composition of programs, or the correlative actions between programs. Another aspect relates to providing an antivirus protection system for computers that is capable of effectively reducing (e.g. blocking) the success of attacks of new viruses, Trojans, worms, or the like, to ensure the safety of the computers.

Certain example embodiments define the concepts of computer viruses according to the actions and/or behaviors of the programs. A virus may be identified by determining if the behaviors of the program accord with the definition of a "virus." The method of manually analyzing the behaviors of programs is the only effective method for identifying new viruses at present. Therefore, certain example embodiments provide an antivirus protection system for computers adopting a dynamic simulation mode, which is a new concept for identifying virus according to the behaviors of programs, and a method for implementing the same. Certain illustrative virus protection systems for computers may comprise a Process Behavior-Evaluating Unit, a Program-Monitoring Unit, a Correlation-Analyzing Unit, a Virus-Identifying Knowledge Base, and a Virus-Identifying Unit.

The Process Behavior-Evaluating Unit may be used to identify the programs existing in the user's computer, and may classify them into normal programs or suspect programs.

The normal programs may comprise all of the known programs identified by the comparison of the programs in computer with the known-program knowledge base that will be described below. Programs may have icons on the computer desktop, may appear in program groups, and may be installed by an installation program.

The installation program may be a program having a running window that creates a program group and/or desktop icons, and optionally creates uninstall programs.

The suspect programs may be the programs excluding the above-described normal programs. The normal programs generally are known programs and programs having identified sources. Therefore, normal programs may be more reliable. In contrast, the suspect programs may not have identified sources, therefore potentially requiring monitoring.

The aspect of distinguishing normal programs from suspect programs may simulate the effect of a program on different types of programs in computers. As for the known programs, because they have already been registered in the Virus-Identifying Knowledge Base of the antivirus protection system for computers of certain example embodiments, they are highly reliable. As for the unknown programs created by installation programs defined by certain example embodiments, they are regarded as normal programs because they have reliable sources and their installation processes are normal. However, as for other unknown programs, because their reliabilities cannot be evaluated, they should be considered to be the major subjects of monitoring. Differently stated, the programs may be regarded as possible harmful programs. Especially for a Trojan, for example, once a virus invades a computer in which the antivirus protection system for computers of certain example embodiments is installed, or once it starts to run, it will be captured and be determined as a suspect program according to an illustrative method for distinguishing normal programs from suspect programs. Thus, the system is monitored. In a similar manner, when a worm remotely attacks a known program, a new program is created after the attack is completed, and the program will also be determined to be a suspect program in accordance with certain example embodiments. Therefore, certain example embodiments are capable of distinguishing normal programs from suspect programs.

The Program-Monitoring Unit may monitor and record the actions and/or behaviors of programs. The unit may monitor programs and record their behaviors by hooking the program's system API (Application Programming Interface) function calls. In conventional operating systems, API calls provided by the system usually are performed during program execution. Therefore, the actions and/or behaviors executed by the program can be monitored by hooking system API call.

The monitored and recorded actions and/or behaviors may include monitoring actions and dangerous actions.

The monitoring actions may affect the computer's safety, and therefore may need to be monitored in real time. The monitoring actions may include the common actions frequently executed by computer programs, and also may include the actions that must be executed by most of the normal programs. The monitoring actions comprise file operations; network operations; creation of processes or threads; system registry operations; windows and tray operations; stack overflows; injection of threads; hooking system API calls; access, modification and creation of user accounts; etc.

The dangerous actions may threaten the computer's safety when running. The dangerous actions may be executed by a few normal programs, but mostly they are executed by virus or Trojan programs. Therefore, it may be harmful to execute these actions. For example, one potentially harmful program changes its running layer by itself. In a Windows operating system, only a few programs automatically become promoted from the application layer (RING3) to the system layer (RING0) for execution, but many invasive virus programs have this characteristic in common.

The dangerous actions may include calling the SHELL program; modifying a program file or writing in a program file; calling the FTP, TFTP, or the like; creating the FTP, TFTP, or similar service; sending a mail; having the browser or mail systems automatically run other programs; creating large numbers of the same threads; modifying and creating user accounts; performing dangerous network operations; adding startup items into the system registry; modifying system startup files; injecting a thread into other process; stack overflowing; automatically promoting applications from the application layer to the system layer; hooking system API call; etc.

Furthermore, there are also some non-monitoring actions, or actions that do not affect a computer's safety, and do not need to be monitored.

The Correlation-Analyzing Unit may create correlative trees, and may perform a correlation analysis of the actions and/or behaviors of programs with the correlative trees.

The correlative trees may include a process tree and a file tree, for example.

In the process tree, each node represents a process and stores the action and/or behavior information when the process is running and the index information in the file tree. The parent node of each node corresponds to the parent process thereof.

The information stored in each node in the process tree may comprise the full path of the PE file, the full path of the loader, whether or not the files have a description, whether or not it is self-starting, who created the self-starting item, other properties about itself, whether or not it is started by the creator, whether or nor it created any startup items by itself, whether or not it has a windows and/or tray icon, the pid number of parent process, the linked list of modified system registry items, the network action linked list, etc. The linked list of modified system registry items may comprise the entry list, key name, value name and value, etc. The network action linked list may comprise type, local port, local IP address, remote port, remote IP address, operation protocol, etc.

In the file tree, each node represents a program and stores the relevant information when the program file is created, and represents its index information in the process tree. The parent node of each node corresponds to its creator. In the virus protection system for computers of certain example embodiments, the information stored in each node of the file tree may comprise the full path of the PE file, the full path of the creator, characteristics of the creator, whether or not the creator has a window, whether or not it is the same file as the creator, whether or not it has copied itself, etc.

The characteristics of the creator may classify all of the programs in the system as belonging to one of: unknown programs, other known programs, mail system, network browser and network intercommunication system, etc. Each program should belong to exactly one of the above categories.

A computer program typically does not carry out a specific function only by one action of the program, but by a behavior including a series of actions of a program or a behavior including a series of actions of multiple programs. Therefore, based on this notion, in certain example embodiments, it may be necessary to analyze and evaluate the actions and/or behaviors including multiple fore-and-aft correlative actions of multiple fore-and-aft correlative processes. Therefore, in certain example embodiments, a Correlation-Analyzing Unit may be used to synthetically analyze and evaluate the correlations of programs and the action behaviors of programs.

The Virus-Identifying Knowledge Base may comprise a Program-Behavior Knowledge Base and a Database of Attack-Identifying Rules. The Program-Behavior Knowledge Base may be a database that analyzes and lists the actions and/or behaviors executed by the known legal programs one by one, by the above-mentioned Program-Monitoring Unit and stores the analysis list therein.

It may comprise program ID, program type, program running layer, privilege of writing PE files, privileges of calling the system SHELL, network behaviors, system registry operations, etc. The program type is the enumerating type of program classification, which is classified into the programs possible to be attacked by buffer overflows and the normal application programs. The description of the network behavior may comprise: action type of network connection, used port number, connection description, etc. The connection description may comprise local port, local address, remote port, remote address, operation protocol, etc. The description of the system registry operation may comprise the number of system registry items operated by the program, the key values of every operation, etc.

By checking the software used by the local computer, the Program-Behavior Knowledge Base records of known program behaviors corresponding to the known programs used by users may be added so that it serves as the Program-Behavior Knowledge Base for the local computer. The Program-Behavior Knowledge Base may be supplemented with the known programs to be used by requests of users.

The Database of Attack-Identifying Rules is a database which summarizes the analyzing and identifying rules of antiviruses and records the attacking behavior features of harmful programs, such as, for example, computer viruses and Trojans. Each record corresponds to a type of viruses. Each type of viruses corresponds to an action collection which comprises a series of actions and the specified correlations between the actions. The specified correlations may comprise the time correlations of former and latter actions, the calling and called correlations, etc.

The Database of Attack-Identifying Rules may comprise: full path of the executable PE file, full path of the creator, characteristics of the creator, whether or not the creator has a window, whether or not it is the same file as the creator, whether or not it is a copy of itself, whether or not the file has a description, whether or not it is self-starting, who created the self-starting item, whether or not it is started by the creator, whether or not it creates a self-starting item by itself, whether or not it has a window or a tray icon, modifications to the linked list of the system registry items and the network action linked list, etc. The sub-data structure of modifying the linked list of the system registry items may comprise type, local port, local address, remote port, remote address, operation protocol, etc.

The Database of Attack-Identifying Rules may comprise:

Virus rule 1, a) A program running in user layer (RING3) switches to the system core layer (RING0);

Virus rule 2, b) And the program is not a anti-virus software, has no window and performs an operation modifying other program files irrespective of the program;

Remote attacking rule 1, c) The program calls the SHELL program immediately upon receiving data through a monitored port;

Remote attacking rule 2, d) The program encounters a buffer overflow upon receiving data through a monitored port;

Remote attacking rule 3, e) The program calls the general file transmission protocol, TFTP program, or the like, immediately upon receiving data through a monitored port;

Mail worm rule 1, f) The program is automatically created by the mail system, and it modifies the self-starting item list of the system registry when running. The program does not have a window and tray icon, and starts to send emails immediately;

Suspect Trojan rule 1, g) The program is automatically created by the mail system, and it modifies the self-starting item of the system registry when running. The program does not have a window and tray icon, and begins network listening immediately;

Network virus rule, h) When a suspect program is running, none of its correlative programs have windows. The suspect program copies itself and modifies the system registry to enable itself or its copy to start at startup of system. The suspect program executes actions comprising one or more of: sending a data package, performing network listening, injecting a thread into other process, creating a global hook, and sending a mail;

Worm virus rule, i) A suspect program, whose files are received from the mail system or an instant communication software, instructs the keyboard or mouse after the program runs and simulates user's actions to automatically send mail by the mail system or to automatically send files by the instant communication software;

Worm virus rules, j) A suspect program, which does not have a window when running, creates over 10 of the same thread, every thread having the action of sending a data package, with data packages being sent within 1 second of each other.

As mentioned above, because the antivirus protection system for computers of certain example embodiments establishes the process tree and the file tree by the correlative analysis of programs while monitoring the programs after the program starts, it is convenient to query the relevant information in comparison with the Program-Behavior Knowledge Base and the Database of Attack-Identifying Rules.

The Virus-Identifying Unit may be used to receive the program actions and/or behaviors captured by the above Program-Monitoring Unit, compare the captured actions and/or behaviors with the information in the Program-Behavior Knowledge Base and/or the Database of Attack-Identifying Rules in combination with the information of the above Process Behavior-Evaluating Unit, and call the Correlation-Analyzing Unit to determine whether the said program is a virus program.

Therefore, the antivirus protection system for computers of certain example embodiments can communicate among the different parts according to the different functions of each part, thereby enabling the Virus-Identifying Unit to correctly determine whether a program is a harmful program, such as a virus.

The antivirus protection method for computers of certain example embodiments may comprise:

17.1) Hooking the system API function call of the program after a computer program is running;

17.2) Monitoring the action of the program, and recording the action of the program in the process tree;

17.3) Determining whether the action is an action of a creating program;

17.4) If the program performs an action of the creating program, adding the program creating information into the file tree, and determining whether the created program is a normal program or not and recording it; or if the program does not perform an action of creating program, determining whether the action is a dangerous action;

17.5) If the action is not a dangerous action, returning to step 17.2); or if the program has performed a dangerous action, determining whether the action and/or behavior is a harmful program behavior by the Virus-Identifying Unit;

17.6) If it is determined the action and/or behavior is not a harmful program behavior, returning step 17.2); or if the action and/or behavior is determined to be a harmful program behavior, the program is dealt with by the Virus-Identifying Unit accordingly.

According to the antivirus protection method for computers of certain example embodiments, the known program and unknown program may be judged respectively (e.g. separately, together, etc.) in the step 17.5).

On one hand, for a known program, the dangerous actions executed by the known program are compared to the legal actions and/or behaviors recorded in the Program-Behavior Knowledge Base to determine whether the program is attacked. If the known program is determined to be a legal program, the method returns to step 17.2); otherwise, it is judged that the program has been attacked by a virus, and the program is terminated.

On the other hand, for an unknown program, the dangerous actions executed are compared to the rules recorded in the Database of Attack-Identifying Rules of Virus-Identifying Knowledge Base to determine whether the program is a harmful program.

If it is determined that it is a harmful program, then the running of the program may be terminated; or if it is determined that it is not a harmful program, the method returns to step 17.2). According to the antivirus protection method for computers of certain example embodiments, the known program may be a program recorded in the above-mentioned Program-Behavior Knowledge Base, and the unknown program is another program, other than the known programs.

In the antivirus protection method for computers of certain example embodiments, the determination of whether the known program has been attacked may comprise:

20.1) Monitoring and capturing the dangerous action executed by the known program;

20.2) Comparing the captured dangerous action to the information in the Program-Behavior Knowledge Base to determine whether it is a legal behavior;

20.3) If it is determined that it is legal, returning to step 20.1); or if it that it is not, determining how the process according to the definition of the Program-Behavior Knowledge Base should be terminated;

20.4) If it is determined that it shold be terminated, then calling the system API to terminate the current process of the known program; or otherwise calling the system API to terminate the current thread of the known program.

In step 20.3), the knowledge base may be defined so that when the system process is in overflow, the system API is called to terminate the current thread. To ensure the safety of the system, it is usually necessary to terminate the process of the attacked program, and when the system process is attacked, it may be necessary to terminate the current thread to ensure the stability of system.

In the antivirus protection system for computers of certain example embodiments, the determination of whether the unknown program is a harmful program comprises:

23.1) Monitoring and capturing the dangerous action executed by the unknown program;

23.2) Determining whether it is a normal program;

23.3) If it is a normal program, then recording the monitored actions and/or behaviors into the Program-Behavior Knowledge Base, and returning to step 23.1); or if it is not a normal program, then comparing to the rules in the Database of Attack-Identifying Rules to determine whether it is a harmful program action;

23.4) If it is determined that it is not a harmful program, then returning to step 23.1); or if it is determined it is a harmful program action, then the user confirms whether the current action should be allowed;

23.5) If the user confirms allowing the current action, then marking the program as a normal program and recording the action and/or behavior into the Program-Behavior Knowledge Base, and returning to step 23.1); or if the user does not allow the action, then calling the system API function to terminate the current process of the unknown program.

In addition, step 23.5) may also directly call the system API to terminate the current process of the unknown program by request of user.

Illustrative components of the antivirus protection system for computers of certain example embodiments and their operating principles have been summarized above.

It will be appreciated that the antivirus protection system for computers of certain example embodiments need not make a determination based only on one action of a program when analyzing harmful program behaviors. Rather, certain example embodiments may determine whether a program is a virus based on the program source and the meaningful behaviors comprising a series of actions of a program or a program group. This information already may have been recorded into the process tree or the file tree by the Correlation-Analyzing Unit when the program starts to run or to be created. For example, a Trojan usually copies itself into the system directories for ensuring long-term existence in a computer. Thus, it may have more than two clone programs, and they may cooperate with each other in running. For the individual clone program, it may be very difficult to determine that the program is a virus, but in combination with its entire loading and creating correlation, it may easy to determine that it as a virus.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various aspects of this invention. In such drawings.

DETAILED DESCRIPTION OF ILLUSTRATED EMBODIMENTS

To facilitate the understanding of certain example embodiments, a description is presented with the Microsoft Windows operating system used as example. Of course, it will be appreciated that the present invention is not so limited.

Figure 1:
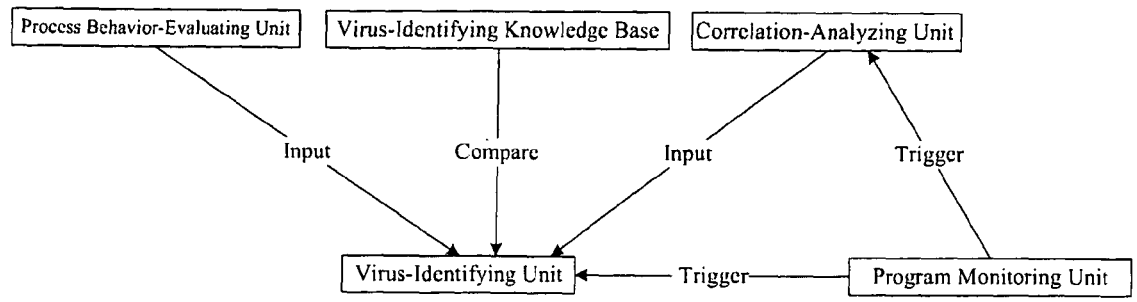
FIG. 1 is an illustrative structural diagram of the antivirus protection system for computers according to certain example embodiments.

FIG. 1 is an illustrative structural diagram of the antivirus protection system for computers of certain example embodiments. As shown in FIG. 1, the antivirus protection system comprises a Process Behavior-Evaluating Unit, a monitoring unit, a Correlation-Analyzing Unit, a Virus-Identifying Knowledge Base, and a Virus-Identifying Unit, with each unit having an associated function. Each unit is described in detail below.

The Process Behavior-Evaluating Unit may be used to identify the programs existing in the user's computer, and to classify them as normal programs or suspect programs. The normal programs comprise all the known programs identified by the comparison of the programs in the computer with the Program-Behavior Knowledge Base that will be described below; the programs having icons on the computer desktop; the programs appearing in program groups; the programs installed by an installation program; and the programs confirmed as normal programs by users. The installation program is a program having a running window that creates a program group and/or desktop icons, and/or creates an uninstall item. Suspect programs are the programs other than the above normal programs.

As mentioned above, since the normal programs are those programs with higher security and reliability, the distinguishing of normal programs and suspect programs may provide a basis for the judgment on the safety of the system.

The Program-Monitoring Unit may be used to monitor and record the actions and/or behaviors of programs. The unit may monitor programs and record their behaviors by hooking the program's system API (Application Programming Interface) function calls. In conventional operating systems, the API call provided by the system is usually performed during program execution. Therefore, the actions and/or behaviors executed by the program can be monitored by hooking system API calls.

The monitored and recorded actions and/or behaviors may include monitoring actions, dangerous actions, non-monitoring actions, etc.

The monitoring actions are the actions which may affect the computer's safety and may need to be monitored in real time. The monitoring actions are the common actions frequently executed by computer programs, and also typically must be executed by most of the normal programs.

The monitoring actions may comprise file operations; network operations; creation of processes or threads; system registry operations; windows and tray operations; stack overflows; injection of threads; hooking system API calls; access, modification and creation of user accounts, etc.

The dangerous actions are the monitoring actions, and they may threaten the computer's safety when running. The dangerous actions are executed by few normal programs, but by most virus or Trojan programs. Therefore, it is likely harmful to execute these actions. For example, one program may change its running layer by itself. In a Windows operating system, only few programs automatically promote themselves from the application layer (RING3) to the system layer (RING0) to be executed, but many invasive virus programs have this characteristic in common.

The dangerous actions may include calling the SHELL program; modifying a program file or writing in a program file; calling the FTP, TFTP, or the like; creating the FTP, TFTP, or similar service; sending a mail; having the browser or mail system automatically run other programs; creating large numbers of the same threads; modifying and creating user accounts; performing dangerous network operations; adding startup items into the system registry; modifying the system startup files; injecting a thread into other processes; stack overflowing; automatically promoting from the application layer to the system layer; hooking system API calls; etc.

The Correlation-Analyzing Unit may be used to create correlative trees, and to perform a correlation analysis of the actions and/or behaviors of programs with the correlative trees. The correlative trees may include a process tree and a file tree.

In the process tree, each node may represent a process, and store the action behavior information when the said process is running and the index information in the file tree. The parent node of each node may correspond to the parent process thereof. The structure of the node is given by the following illustrative data structure:

```
struct RuntimePEFileInMem
{
Char FileName[MAX_PATH];// full path of PE file
Char LoaderFileName[MAX_PATH]; // full path of loader
Char LoaderDescription; //whether or not the file has a description
Char AutoRun; //whether or not it is self-starting
```

-continued

```
Char WhoWriteAutoRun; //who create the self starting item,
  0 unknown ;
  1 self ;
  2 creators
Char CharacterOfSelf;//other characteristics of itself
BOOLEAN RunByCreator;//whether or not it is started by creator
BOOLEAN RunBySelf;//whether or not it create a starting item by itself
BOOLEAN CreateWindow;//whether or not it has a window or a tray icon
UNIT ppid;//parent process pid
LIST_ENTRY RegList;// linked list of modified system registry items
LIST_NET ListNetAction;//network action linked list
}
```

The structure of RegList is given by the following illustrative data structure:

```
struct REG_DATA
{
  :LIST_ENTRY List;
  char Key[ ];
  char ValueName[ ];
  char Value[ ];
}
```

The structure of ListNetAction is given by the following illustrative data structure:

```
struct LIST_NET
{
  int type;
  short lport;
  IPADDR lipaddr;
  short dport;
  IPADDR dipaddr;
  short protocol;
};
```

An illustrative structure of the process tree will be described in detail with reference to FIG. 2, using the examples of loading MSN and ICQ onto a Microsoft Windows-based operating system.

Figure 2:
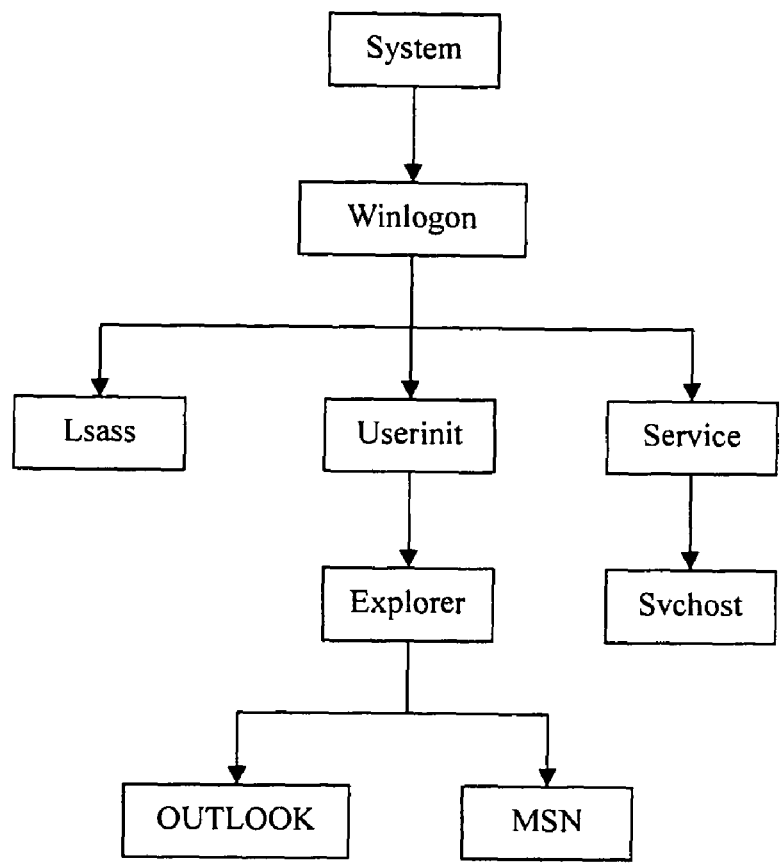
FIG. 2 is an illustrative schematic diagram of the process tree in the antivirus protection system for computers according to certain example embodiments.

FIG. 2 illustrates the correlation of the system process load. Those skilled in the art will understand the loading relation of each process clearly and will understand that the computer typically first loads the system processes after starting, and then gradually loads various software programs. Therefore, the process tree is substantially constantly changing and updating as system time progresses. Creating the process tree makes it convenient to find the running status of various processes in the computer and to manage the processes.

In the file tree, each node represents a program, and stores the relevant information when the program file is created and its index information in the process tree. The parent node of each node corresponds to its creator.

The information stored in each node of the file tree may comprise: full path of the PE file, full path of the creator, characteristics of the creator, whether or not the creator has a window, whether or not it is the same file as the creator, whether or not the file has copyied itself, etc.

The characteristics of the creator may be selected from the group comprising unknown programs, other known programs, the mail system, network browsers and network intercommunication systems, etc. Its structure is given by the following illustrative data structure:

```
struct StaticPEFileInMem
{
    Char FileName[MAX_PATH];// full path of PE file
    Char CreatorName[MAX_PATH];//full path of creator
    Char CharacterOfCreator;//characteristics of creator
        -1 unknown program ;
        0 other known program ;
        1 mail program ;
        2 network browser ;
        3 network intercommunication system (for example MSN, ICQ)
    Char NoWindowOfCreator;//whether or not creator has a window
    Char SameAsCreator;//whether it is the same file as creator
    Char CopySelf;// copy of itself
}
```

An illustrative structure of the file tree will be described in detail with reference to FIG. 3, using the Microsoft Windows operating system as example.

Figure 3:
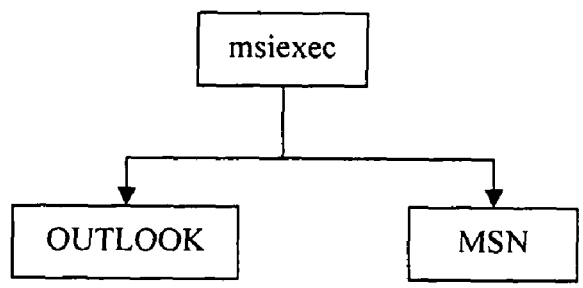
FIG. 3 is an illustrative schematic diagram of the file tree in the antivirus protection system for computers according to certain example embodiments.

FIG. 3 illustrates the correlation created by the system program. Those skilled in the art will understand the creation of the correlation of each program clearly and will understand that the MSN and Outlook programs are created by the misexec program. The creation of the correlation records the initial parent-child relation when the program is created. Therefore, once the file tree is created, it is saved as a system log for use in the future. Accordingly, the file tree remains unchanged when the computer is running.

The Virus-Identifying Knowledge Base may Comprise a Program-Behavior Knowledge Base and a Database of Attack-Identifying Rules.

The Program-Behavior Knowledge Base may be a database, which analyzes and lists the actions and/or behaviors executed by the known legal programs one by one, by the above-mentioned Program-Monitoring Unit, and stores the analysis list therein.

It may comprise Program ID, program type, program running layer, privilege of writing PE files, privilege of calling system SHELL, network behavior, system registry operation, etc. The program type is the enumerating type of the program classification, which is classified into programs susceptible to attack by buffer overflow, and normal application programs. The network behavior may comprise: action type of network connection, used port number, connection description, etc. The connection description may comprise local port, local address, remote port, remote address, operation protocol, etc. The system registry operation may comprise the number of system registry items operated by the program and the key values of each operation, etc.

The Program-Behavior Knowledgebase is given by the following illustrative data structure:

```
struct Know
{
    DWORD type1;// enumerating type of program classification, which is
        temporarily classified into programs susceptible to attack by buffer
        overflow, and normal application programs at present, and the
        description is,
        enum KnowType {OVERFLOW, NORMAL}
```

-continued

```
    BOOL bAllowedWriteFile;// whether the program can write an
        executable PE file
    BOOL bCreateShell;// whether the program can call the system shell
    DWORD NetOffset;// how much offset in the file of knowledge base,
        indicating the description of the program's network behavior
    DWORD RegOffset;// how much offset in the file of knowledge base,
        indicating the description of the program's system registry
        operating behavior
};
```

The following illustrative sub-structure is used to describe the program's network action and/or behavior in the Program-Behavior Knowledge Base:

```
struct Net
{
    short type2;// action types of network connections are classified into two
        categories, listening and connecting, and are described as:
        enum NetType { Listen,Connect}
    int num;// the number of related ports
    ListenPort port[ ];
};
```

ListenPort has the following illustrative structure for the description of each connection:

```
struct ListenPort
{
    short lport;// used local port
    IPADDR lipaddr;// used local address
    short dport;// connected remote port
    IPADDR dipaddr;// connected remote address
    short protocol;// used protocol, defined with TCP/IP protocol
};
```

An illustrative structure of describing the actions and/or behavior of system registry operations of the program with the following sub-structure in the Program-Behavior Knowledge Base is:

```
struct Reg
{
    int num;// the number of operated system registry items
    char fullregname [ ];//key value of each operation
};
```

The Program-Behavior Knowledge Base may be populated with the records of known program behaviors corresponding to the known programs used by users by checking the software used by local computers, so that it serves as the Program-Behavior Knowledge Base for the local computer. Further, the Program-Behavior Knowledge Base may be supplemented with the known programs to be used at the requests of users, thereby reducing the strain on system resources.

The Database of Attack-Identifying Rules is a database which summarizes the analyzing and identifying rules of antiviruses and records the attacking behavior features of harmful programs, such as, for example, computer viruses, Trojans, etc. Each record corresponds to a type of virus, and each type of virus corresponds to an action collection which comprises a series of actions and the specified correlations between the actions. The specified correlations comprise the time correlations of former and latter actions and the calling and called correlations.

The Database of Attack-Identifying Rules may comprise: full path of the executable PE file, full path of the creator, characteristics of the creator, whether or not the creator has a window, whether or not it is the same file as the creator, whether or not it is the copy of itself, whether or not the file has a description, whether or not it is self-starting, who created the self-starting item, whether or not it is started by the creator, whether or not it creates a self-starting item by itself, whether or not it has a window or a tray icon, whether or not it modified the linked list of the system registry items and the network action linked list, etc. The sub-data structure of "modified the linked list of the system registry items" may comprise entry list, key name, value name and value, etc. The linked list of network actions may comprise type, local port, local address, remote port, remote address, operation protocol, etc.

An illustrative data structure of each record is given by the following:

```
struct UnknowPEFileInMem
{
    Char WeighofDanger;//weight of danger
    Char FileName[MAX_PATH]; //full path of newly created PE file
    Char CreatorName[MAX_PATH];// full path of creator
    Char CharacterOfCreator; //character of creator
    Char NoWindowOfCreator; //whether the creator has a window
    Char SameAsCreator; //whether it is the same file as creator
    Char CopySelf; //copy of itself, it is CopySelf for the creator, and it is
        SameAsCreator for the copied file , the two files are
        distinguished on this basis
    Char FileDescription;//whether the file has a description
    Char AutoRun; //whether the file is self starting
    Char WhoWriteAutoRun; //who created the self starting item
    BOOLEAN RunByCreator; //whether the file is started by creator
    BOOLEAN RunBySelf; //whether the file created a starting item
        by itself
    BOOLEAN bCreateWindow; //whether the file has a window or a
        tray icon
    LIST_ENTRY RegList; //modified system registry items linked list
    LIST_NET   ListNetAction; // linked list of network actions
}
```

Illustrative detailed data records and descriptions of "CharacterOfCreator" are:
−1: unknown program
0: other known program
1: mail system;
2: network browser
3 network intercommunication system (for example, QQ and MSN etc.);

Illustrative detailed data records and descriptions of "WhoWriteAutoRun" are:
0: unknown
1: itself
2: creator
3: Both itself and the creator An illustrative sub-data structure of the linked list of modified system registry items is given by:

```
struct REG_DATA
{
    LIST_ENTRY List;//entry list
    char Key[ ];//key name
    char ValueName[ ];//value name
    char Value[ ];//value
}
```

An illustrative sub-data structure of the network action linked list is given by:

```
struct LIST_NET
{
    int type;// type
    short lport;//local port
    IPADDR lipaddr;//local IP address
    short dport;//remote port
    IPADDR dipaddr;//remote IP address
    short protocol;//operation protocol
};
```

The Database of Attack-Identifying Rules may comprise the following illustrative rules:

Virus rule 1, a) A program running in the user layer (RING3) switches to the system core layer (RING0);

Virus rule 2, b) And the program is not anti-virus software, has no window and performs an operation modifying other program files irrespective of the program;

Remote attacking rule 1, c) The program calls the SHELL program immediately upon receiving data through a monitored port;

Remote attacking rule 2, d) The program experiences a buffer overflow upon receiving data through a monitored port;

Remote attacking rule 3, e) The program calls the general file transmission protocol, TFTP program, or the like, immediately upon receiving data through a monitored port;

Mail worm rule 1, f) The program is automatically created by the mail system, and it modifies the self-starting item of system registry while running. The program does not have a window and/or tray icon, and starts to send emails immediately;

Suspect Trojan rule 1, g) The program is automatically created by the mail system, and it modifies the self-starting item of the system registry while running. The program does not have a window and/or tray icon, and starts network listening immediately;

Network virus rule, h) When a suspect program is running, none of its correlative programs have windows. The suspect program copies itself and modifies the system registry to enable itself or its copy to run at system startup. The suspect program executes one or more actions comprising sending a data package, network listening, injecting a thread into other processes, creating a global hook and/or sending a mail, etc.

Worm virus rule 1, i) A suspect program, whose files are received from the mail system or an instant communication software after the program runs instructs the keyboard or mouse, and simulates user's actions to automatically send mails by the mail system or to automatically send files by the instant communication software;

Worm virus rule 2, j) A suspect program, which does not have a window when running creates over 10 of the same threads, every thread having the action of sending data a package, with data packages being sent within 1 second of each other.

The Virus-Identifying Unit may be used to receive the program actions and/or behaviors captured by the above-noted Program-Monitoring Unit, to compare the captured actions and/or behaviors with the information in the Virus- Identifying Knowledge Base in combination with the information of the Process Behavior-Evaluating Unit, and to call the Correlation-Analyzing Unit if needed to determine whether the program is a virus program.

It will be appreciated that the antivirus protection system for computers of certain example embodiments may determine whether a program is a harmful program by analyzing the program's actions and/or behaviors. Therefore, when searching in the Virus-Identifying Knowledge Base, certain example embodiments may search the current action of the program and also may analyze and evaluate the entire program behavior in combination with the previous action of the program.

One preferred embodiment is described in detail below using an attack by a virus as an example.

For a known program, if its program behavior description is "cannot modify a program file", but it has modified another program file while running, this dangerous action may be monitored by the system, and then compared with the legal actions and/or behavior of the known program stored in the Program-Behavior Knowledge Base. If it is a different action, it is determined that the known program must be infected by a virus. For example, the CIH virus may be found using this method. When a known program is infected by the CIH virus, the known program will attempt to infect other PE files. Therefore, the example method may block the virus without knowing it, thereby reducing the risk of new viruses related to the lag in upgrading anti-virus code.

Certain example embodiments will be described in detail using the blocking of the Sasser worm as an example. The Sasser worm is different from other worms in that it does not send mails. Its working principle includes locally opening a back-door, and monitoring the TCP 5554 port as an FTP server to wait for a remote control command. The virus provides file transmission via FTP. A hacker can steal files and other information in user's computer through this port. The virus builds 128 scan threads, and assumes random IP addresses based on local IP address to intensively try to connect to port 445 and to perform an attack by use of a buffer overflow leak existing in the LSASS module of the Windows operating system. Once it successes, the computer will be infected by this worm and the worm may spread.

When certain example embodiments are implemented, however, when a computer becomes infected by Sasser, it sends an attacking package to the protected system. The LSASS process in the local computer will overflow, and the overflow code will call GetProcAddress, which can be captured by the monitoring unit and may be determined to be a buffer overflow. Before the overflow, the LSASS process will receive data from ports 139 and 445 of system. These symptoms accord with rule d) described above. Therefore, certain example embodiments may accurately detect the remote attacking, and the system may call ExitThread to terminate the process. Thus, Sasser may not take further actions and computers may be protected effectively.

Certain other example embodiments will be further described in detail below with capturing the Active Online Trojan Backdoor.Win32.Singu as an example. Because the program is an unknown program, it may be captured by the monitoring unit as soon as it starts to run. The program does not create an application program window and a system tray icon, and it modifies the startup item of system registry after running to ensure that it starts automatically at the next user's login. This action may be captured by the monitoring unit as a dangerous action. The process proceeds to connect with a remote web server to obtain the information of the client service address and port, so as to build a connection for transmitting the information. After this network connecting action is captured, it will be compared with the Database of Attack-Identifying Rules together with the above actions. If they match with rule g) of the Database of Attack-Identifying Rules, the program is determined to be a suspected Trojan, and the system will warn the user and indicate that the illegal program is a suspected Trojan, so that the user may more accurately assess the information. In doing so, certain example embodiments may overcome the disadvantage of conventional firewall systems that alert the user when network actions occur and require the user to determine the security of the alerted action. Therefore, certain example embodiments may reduce troubles relating to the user's lack of computer knowledge regarding protection systems.

As another example, the Trojan Backdoor.Win32.Nethief enters a computer system as mail, etc. In its first running, it copies itself to the system directory and sets its attribute to hidden. Then, it starts the copy under the system directory and exits the primary copy. The copy finds itself under the system directory when it runs, and does not make another copy, but directly modifies the startup item of the system registry to set itself as self-starting. Then, it connects to a remote server according to the remote server information it carries, and provides the current computer information and undertakes remote control. However, when the copy attempts to transmit the information of the computer to the remote server, it may trigger the judging process of the antivirus protection system of certain example embodiments. First, it is determined to be a suspect program. Second, it is determined that its creator is also a suspect program from its creation correlation, and there is no window when the creator created this copy, and the creator copied itself. Third, it is determined that its loader and the creator of the copy are the same program, and that the copy has set a self-starting item. Therefore, it is determined that this is the first running of the program, because otherwise the loader should be Explorer. Moreover, it attempts to send a data package to a remote address. Therefore, it may be accurately determined that the virus matches with rule h). Furthermore, the source of the virus, such as from the mail system, may be known according to the creating correlation of the virus, thus facilitating the troublesome source.

In still another example, the Backdoor.Win32.Rbot.hg sends itself to users by pretending to be one of the contacts, and the users saves and runs it by mistake. The creator of the virus is MSN, and the virus simulates the user to send itself to MSN contacts by manipulating the keyboard and/or mouse, so as to spread the virus. Therefore, the virus matches with rule i), and can be determined to be a harmful program.

Because the antivirus protection system for computers of certain example embodiments builds a process tree and a file tree by performing a correlation analysis of programs while monitoring the program after a program is started, it is convenient to recall the relevant information in analyzing program behaviors, so as to effectively search the Virus-Identifying Knowledge Base and to reduce system costs.

Although viruses are diverse, harmful programs, types of virus may have common manners of attack. Therefore, as long as the common points of one type of virus program and its destructive actions and/or behaviors are captured, it can be detected effectively and terminated before it attacks the computer system. Certain example embodiments are based on this characteristic of virus programs. Certain example embodiments not only have higher operation efficiency and lower system costs compared to conventional virus protection software, but they may effectively reduce the chances of computer systems being destroyed by new harmful programs, such as viruses, Trojans, etc.

To make the techniques of certain example embodiments more clear, illustrative methods will now be described in greater detail.

FIG. 1 is an illustrative block diagram of the antivirus protection system for computers of certain example embodiments. As shown in FIG. 1, the Program-Monitoring Unit sends the captured monitoring actions and dangerous actions to the Correlation-Analyzing Unit to create the process tree and the file tree. At the same time, the dangerous actions trigger the Virus-Identifying Unit to analyze the program behavior. During the analyzing process, the Virus-Identifying Unit also needs to recall the information in the Process Behavior-Evaluating Unit, the Virus-Identifying Knowledge Base, and the Correlation-Analyzing Unit to determine whether the program action and/or behavior is harmful.

Figure 4:
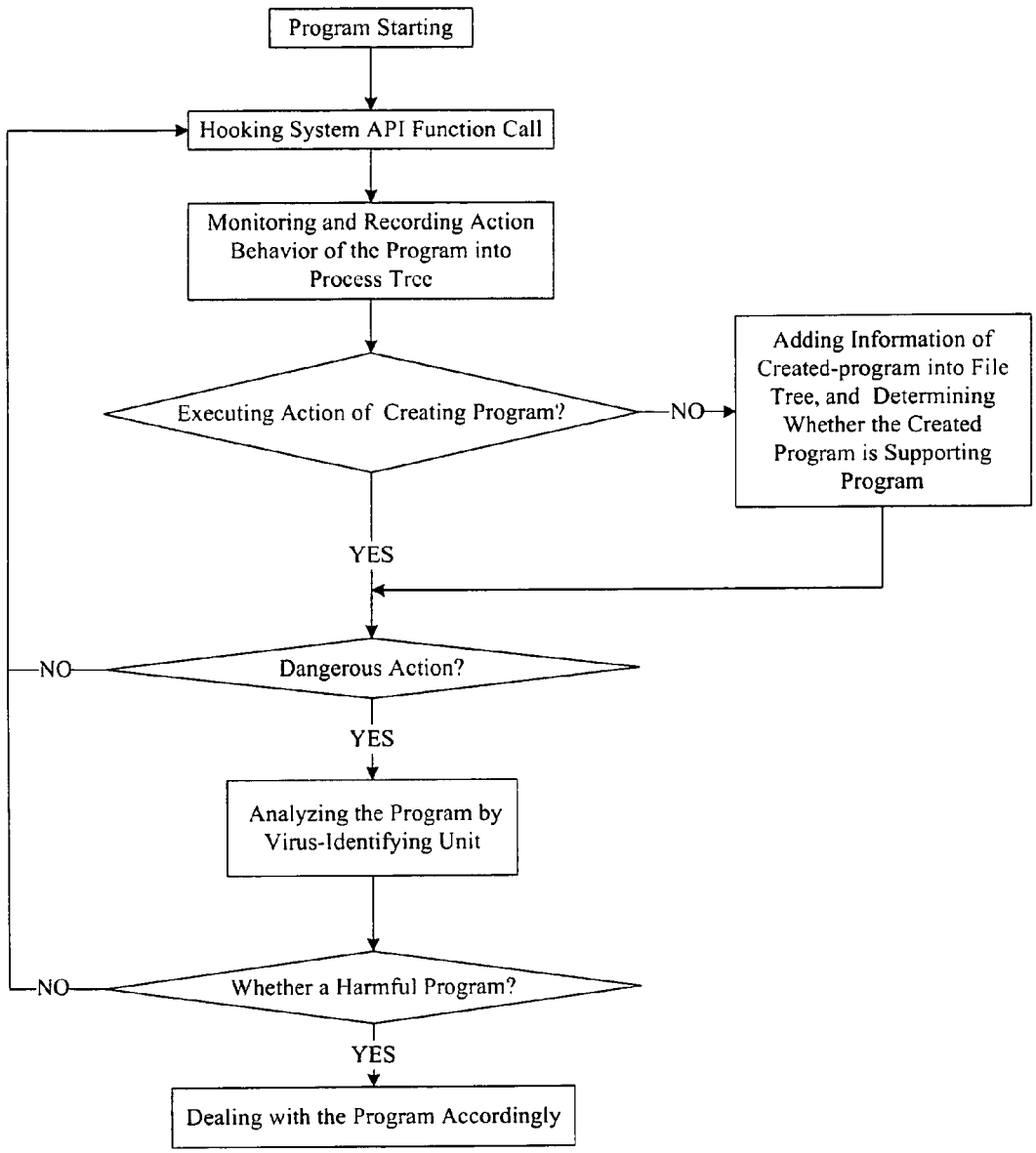
FIG. 4 is an illustrative flow diagram of the antivirus protection method for computers according to certain example embodiments.

As shown in FIG. 4, the antivirus protection method for computers of certain example embodiments may comprise the following steps:

17.1) Hooking the system API function call of the program after a computer program is running;

17.2) Monitoring the action of the program, and recording the action of the program in the process tree;

17.3) Determining whether the action is an action of creating a program;

17.4) If the program performs an action of creating a program, adding the program creating information into the file tree, and determining whether the created program is a normal program or not and recording it; or if the program does not perform an action of creating program, determining whether the action is a dangerous action;

17.5) If the action is not a dangerous action, returning to step 17.2); or if the program has performed a dangerous action, determining whether the action and/or behavior is a harmful program behavior by the Virus-Identifying Unit;

17.6) If it is determined the action behavior is not a harmful program behavior, returning to step 17.2); or if the action behavior is determined to be a harmful program behavior, the program is dealt with by the Virus-Identifying Unit accordingly.

In the antivirus protection method for computers of certain example embodiments, step 17.5) may adopt a method for distinguishing between known programs and unknown programs. For a known program, the actions and/or behaviors executed are compared to the legal actions and/or behaviors of known programs recorded in the Program-Behavior Knowledge Base; and for an unknown program, the actions and/or behaviors executed are compared to the rules recorded in the Database of Attack-Identifying Rules, so as to determine whether the known program is attacked or whether the unknown program is a harmful program. Illustrative steps of evaluating and dealing with the known programs and unknown programs in the Virus-Identifying Unit will be described in detail.

Figure 5:
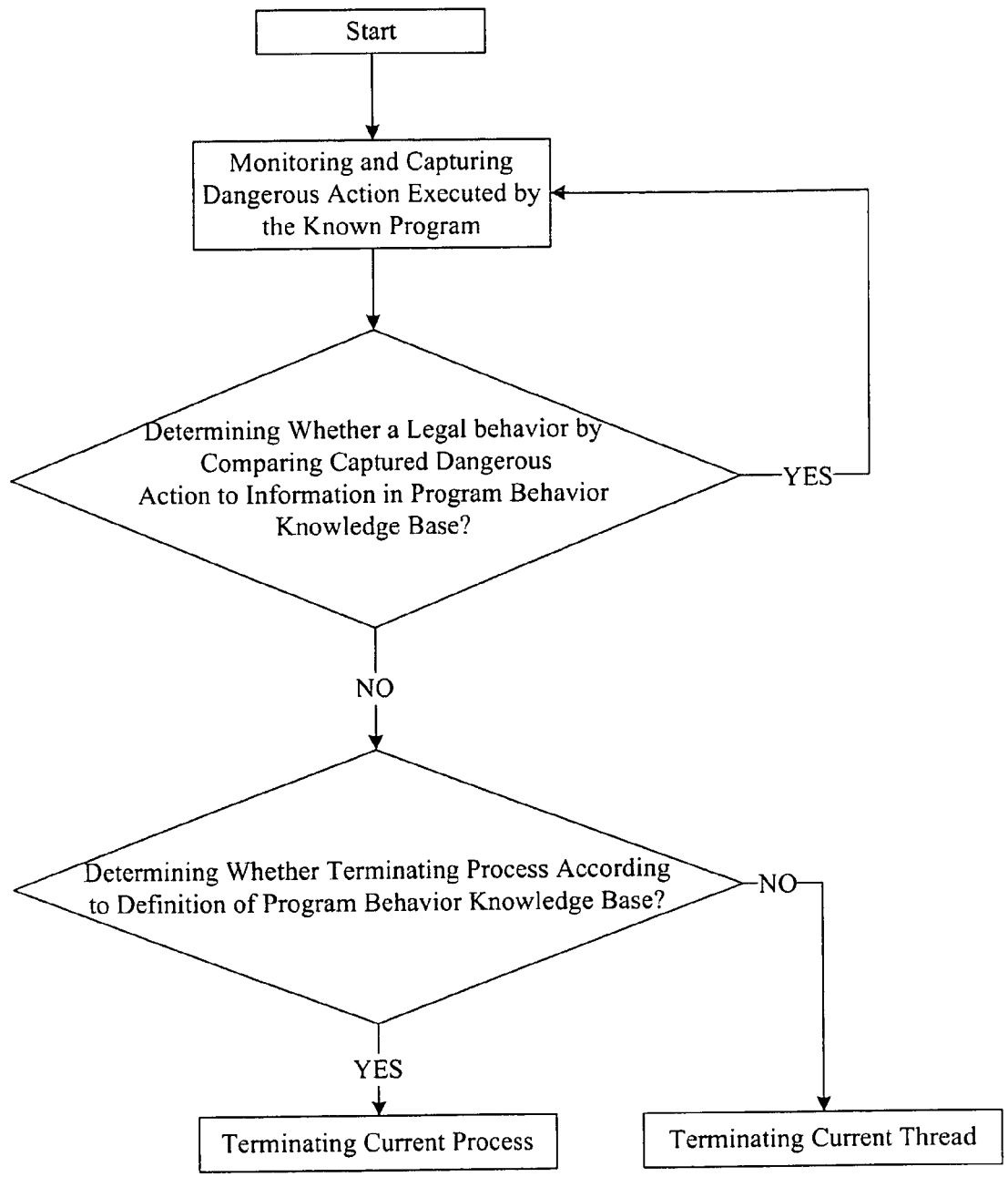
FIG. 5 is an illustrative flow diagram showing how to determine whether a known program is attacked according to the antivirus protection method for computers of certain example embodiments.

As shown in FIG. 5, evaluating whether a known program has been attacked may comprise the following illustrative steps:

20.1) Monitoring and capturing the dangerous action executed by the known program;

20.2) Comparing the captured dangerous action to the information in the Program-Behavior Knowledge Base to determine whether it is a legal behavior;

20.3) If it is determined that is a legal behavior, then returning to step 20.1); or if it is not, then determining how the process should be terminated according to the definition of the Program-Behavior Knowledge Base;

20.4) If it is determined that it should be terminated, then calling the system API to terminate the current process of the known program; or if it is not, then calling the system API to terminate the current thread of the known program.

In step 20.3), the knowledge base may be defined so that when the system process is in overflow, the system API is called to terminate the current thread.

Among the known programs, quite a few provide core functions of the system. Directly terminating these programs may cause the system to reboot, or even to break down. Therefore, in certain example embodiments, the programs in the Program-Behavior Knowledge Base are defined such that only when those system programs are attacked by overflows are their current threads terminated. As mentioned above, this provides system safety while reducing the impact on system operation, thereby enabling the system to operate more stably. It may overcome the disadvantage of conventional firewalls that, the process of detecting and killing viruses in important service programs may damage the important program files in the system, thereby affecting the stability of system. For example, in the Microsoft Windows operating system, Lsass.exe is a system service program, and if the program is attacked via an overflow, its process should not be terminated, because this will cause the system to reboot, and make system unstable. Therefore, the thread attacked by the overflow in the program may be terminated according to certain example embodiments and the definition in the Program-Behavior Knowledge Base, thereby providing system safety while reducing the harmful program's ability to harm the system. As another example, the Microsoft Word software also is susceptible to overflow attacks, but because it is not system service software, the entire Word process may be terminated according to certain example embodiments and the definition in the Program-Behavior Knowledge Base, thereby providing system safety.

Figure 6:
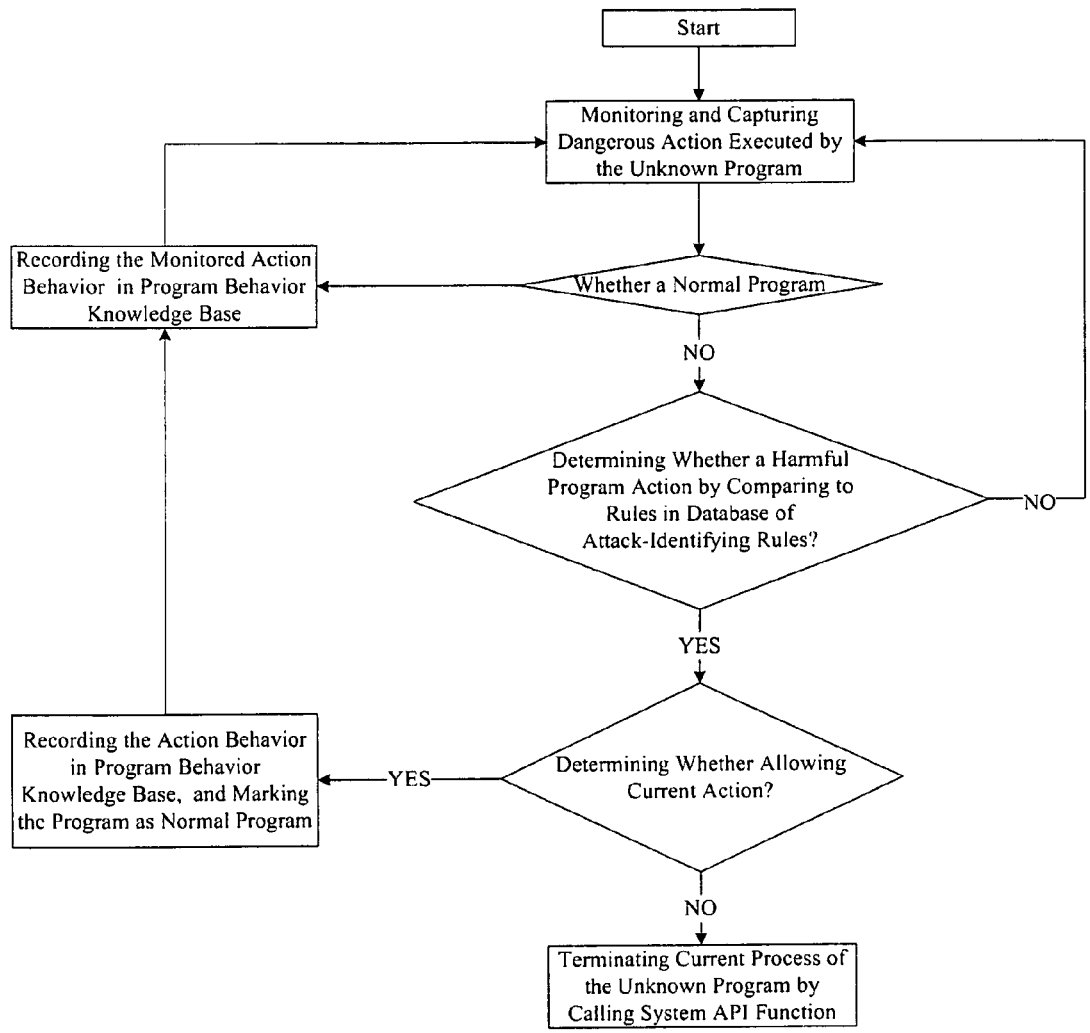
FIG. 6 is an illustrative flow diagram showing how to determine whether an unknown program is harmful according to the antivirus protection method for computers of certain example embodiments.

As shown in FIG. 6, illustrative steps of evaluating whether an unknown program is a harmful program may comprise:

23.1) Monitoring and capturing the dangerous action executed by the unknown program;

23.2) Determining whether it is a normal program;

23.3) If it is a normal program, then recording the monitored actions and/or behaviors in the Program-Behavior Knowledge Base, and returning to step 23.1); or if it is not a normal program, then using the rules in the Database of Attack-Identifying Rules to determine whether it is a harmful program action;

23.4) If it is determined that it is not a harmful program action, then returning to step 23.1); or if it is determined it is a harmful program action, then the user may confirm whether the current action should be allowed;

23.5) If the user allows the current action, then marking the program as a normal program and recording the action behavior into the Program-Behavior Knowledge Base, and returning to step 23.1); or if the user does not allow the action, then calling the system API function to terminate the current process of the unknown program.

In addition, in step 23.5), the system API also may be directly called to terminate the current process of the unknown program by the request of the user. This may be more convenient for the users lacking in computer knowledge.

As mentioned above, the antivirus protection system for computers of certain example embodiments is not only able to effectively block known virus programs, but also may be able to detect harmful programs, such as unknown viruses, Trojans, etc., thereby providing computer safety.

Also, the antivirus protection system for computers of certain example embodiments may substantially overcome one or more of the disadvantages of conventional antivirus software. For example, conventional antivirus programs may be able to identify known viruses only, and updating of virus databases of conventional antivirus software may be later than the occurrence of new viruses. The antivirus protection system for computers of certain example embodiments may establish a wholly-new antivirus protection system for computers.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An antivirus protection system for computers, comprising:
   a Process Behavior-Evaluating Unit for identifying programs existing in a user's computer and classifying the programs as normal programs or suspect programs;
   a Program-Monitoring Unit for monitoring and recording actions and/or behaviors of the programs;
   a Correlation-Analyzing Unit for creating correlative trees and analyzing correlations of actions and/or behaviors of programs, the correlative trees comprising a process tree and a file tree, wherein each node in said process tree represents a process, and stores action and/or behavior information of the respective process during running and index information of the process in the file tree, and further each node has a parent node corresponding to the parent process of the process corresponding the node, and wherein, in the file tree, each node represents a program, and stores information when the program file is created and index information in the process tree, and further each node has a parent node corresponding to the parent process of the process corresponding the node;
   a Virus-Identifying Knowledge Base, comprising a Program-Behavior Knowledge Base and a Database of Attack-Identifying Rules, wherein the Program-Behavior Knowledge Base stores correlation behaviors of the normal programs and the Database of Attack-Identifying Rules stores correlation behaviors of the suspect programs; and
   a Virus-Identifying Unit for receiving program actions and/or behaviors captured by the Program-Monitoring Unit, when the program actions and/or behaviors are dangerous actions, calling the correlation-Analyzing Unit to create correlation behavior according to the process tree and the file tree, if the program is a normal program according to the Process Behavior-Evaluating Unit, comparing the captured actions and/or behaviors to information stored in the Program-Behavior Knowledge Base, and if the program is a suspect program, comparing the captured actions and/or behaviors to information stored in the Database of Attack-Identifying Rules to determine whether the program is a virus in dependence on the comparison.

2. The system of claim 1, wherein the Program-Monitoring Unit is configured to capture and record the program actions and/or behaviors by hooking one or more system API function calls of the program.

3. The system of claim 1, wherein:
   the normal programs comprise all known programs identified by the comparison of the programs in the computer with the known-program knowledge base, programs having icons on the computer's desktop, programs appearing in program groups, and programs installed by an installation program; and,
   the suspect programs comprise programs excluding the normal programs.

4. The system of claim 3, wherein the installation program is a program having a running window that creates a program group and/or desktop icons, and creates an uninstall item.

5. The system of claim 1, wherein the information stored in each node in the process tree comprises at least one of: a full path associated with a PE file, a full path of the process' loader, whether the process has a description, whether the process is self-starting, a creator of a self-starting process, properties associated with the process, whether the process is started by its creator, whether the process created any startup items, whether the process has an associated windows and/or tray icon, a pid number of the process's parent process, a linked list of modified system registry items, and a network action linked list.

6. The system of claim 5, wherein the linked list of modified system registry items comprises a structure including at least entry list, key name, value name, and value, each being associated with the registry items.

7. The system of claim 5, wherein the network action linked list comprises a structure including at least type, local port, local IP address, remote port, remote IP address, and operation protocol, each being associated with the network action.

8. The system of claim 1, wherein the information stored in each node of file tree comprise at least one of: a full path associated with a PE file, a full path of the file's creator, a characteristic of the creator, whether the creator has a window, whether the file and the creator are the same file, and whether the file has copied or is copying itself.

9. The system of claim 8, wherein the characteristic of the creator is to classify all programs comprising unknown programs, a mail system, a network browser, a network intercommunication system, and other known programs.

10. The system of claim 1, wherein the Program-Behavior Knowledge Base is a database configured to analyze and list actions and/or behaviors executed by each of the known programs by hooking the computer's system API functions, and is further configured to store the analysis and list therein; and
   further wherein the Database of Attack-Identifying Rules is a database configured to record the attacking behavior features of computer viruses, worms, and/or other harmful programs, each record in the Database of Attack-Identifying Rules corresponding to a type of virus, each type of viruses corresponding to an action collection which comprises a series of actions and the correlations between the actions.

11. The system of claim 1, wherein the Database of Attack-Identifying Rules comprises a network virus rule, the network virus rule being when a suspect program is running to detect that:
   none of its correlative programs have windows,
   the suspect program copies itself and performs system registry modifications to enable itself or its copy to run at system startup, and
   the suspect program executes actions comprising sending a data package, network listening, injecting a thread into other processes, creating a global hook and sending a mail.

12. The system of claim 11, wherein the Database of Attack-Identifying Rules comprises a worm virus rule, the worm virus rule being to detect:
- a suspect program, receives files from a mail system or an instant communication software, and
- after the suspect program runs, the suspect program operates a user keyboard and/or user mouse to simulates user's actions to automatically send mails by the mail system and/or to automatically send files via the instant communication software.

13. The system of claim 11, wherein the Database of Attack-Identifying Rules comprises a worm virus rule, the worm virus rule being to detect:
- a suspect program, which does not have a window when running and creates over 10 of same threads, every thread for sending subsequent data packages within 1 second of each other.

14. The system of claim 1, wherein the Virus-Identifying Unit judges the known programs and the unknown programs respectively by:
- comparing the dangerous actions executed by a known program to actions and/or behaviors recorded in the Program-Behavior Knowledge Base to determine whether the dangerous actions are legal actions, and
- comparing the dangerous actions executed by an unknown program to virus rules recorded in the Database of Attack-Identifying Rules to determine whether the dangerous actions are harmful actions and/or behaviors.

15. A method of using the antivirus protection system of claim 1, the method comprising:
- 15.1) hooking system API function calls of a program by the Program-Monitoring Unit after the program is running;
- 15.2) monitoring actions of the program, and recording the actions of the program in a process tree by the Program-Monitoring Unit;
- 15.3) determining whether the action is a program creation action by the Virus-Identifying Unit;
- 15.4) if the program performs a program creation action, adding program creation information associated with the program creation action into a file tree by the Program-Monitoring Unit, and determining whether the created program is a normal program or suspect program, and recording the result of the determination by the Process Behavior-Evaluating Unit; or if the program does not perform a program creation action, determining whether the action is a dangerous action;
- 15.5) if the action is not a dangerous action, returning to step 15.2), and if the program actions and/or behaviors are dangerous actions according to the Process Behavior-Evaluating Unit, calling the Correlation-Analyzing Unit to create correlation behavior according to the process tree and the file tree, if the program is a normal program according to the Process Behavior-Evaluating Unit, comparing the captured actions and/or behaviors to information stored in the Program-Behavior Knowledge Base, and if the program is a suspect program, comparing the captured actions and/or behaviors to information stored in or the Database of Attack-Identifying Rules, in combination with information stored in the Process Behavior-Evaluating Unit, and calling the Correlation-Analyzing Unit to determine whether the program is a virus in dependence on the comparison.

16. The method of claim 15, wherein, in step 15.5), a known program and an unknown program are judged separately.

17. The method of claim 15 or 16, further comprising when the dangerous actions executed by a known program, comparing the dangerous actions to the legal actions and/or behaviors recorded in the Program-Behavior Knowledge Base to judge whether the program is attacked; and,
- if the known program is determined to be a legal program, returning to step 15.2) or otherwise judging that the program has been attacked by a virus, and terminating program execution.

18. The method of claim 17, wherein the determination of whether the known program has been attacked comprises:
- 18.1) monitoring and capturing dangerous actions executed by the known program;
- 18.2) comparing captured dangerous actions to information stored in the Program-Behavior Knowledge Base to determine whether the captured dangerous action is a legal behavior;
- 18.3) if it is determined to be a legal behavior, returning to step 18.1), or if it is determined to be not a legal behavior, determining how to terminate a process associated with the program according to the Program-Behavior Knowledge Base;
- 18.4) if it is determined that the process should be terminated, terminating the process of the known program via a system API call; or if it is determined that the process should not be terminated, terminating a thread of the program via a system API call.

19. The method of claim 18, wherein in step 18.3), the knowledge base may be defined so that when a system process is in overflow, a system API call terminates the thread.

20. The method of claim 15 or 16, wherein for an unknown program, the dangerous actions executed are compared to virus rules recorded in a Database of Attack-Identifying Rules to determine whether the program is a harmful program; and
- if it is determined to be a harmful program, terminating program execution, otherwise returning to step 15.2).

21. The method of claim 16, wherein the determination of whether the unknown program is a harmful program comprises:
- 21.1) monitoring and capturing dangerous actions executed by the unknown program;
- 21.2) determining whether the unknown program is a normal program;
- 21.3) if it the unknown program is a normal program, recording the monitored actions and/or behaviors into the Program-Behavior Knowledge Base, and returning to step 21.1), or if it is not a normal program, reviewing the rules in the Database of Attack-Identifying Rules to determine whether the actions and/or behaviors are harmful program actions;
- 21.4) if it is determined that the actions and/or behaviors are not harmful program actions, returning to step 21.1), or if it is determined that the actions and/or behaviors are harmful program actions, requiring user confirmation as to whether to allow the current action;
- 21.5) if the user allows the current action, marking the program as a normal program and recording the action and/or behavior in the Program-Behavior Knowledge Base, and returning to step 21.1), or if the user does not allow the action, terminating a process of the unknown program via a system API call.

22. The method of claim 21, wherein step 21.5) includes a direct system API call to terminate the process of the unknown program upon a user request.

* * * * *